(12) United States Patent
Beule et al.

(10) Patent No.: US 8,179,072 B2
(45) Date of Patent: May 15, 2012

(54) METHOD FOR COUNTING THE NUMBER OF REVOLUTIONS OF A BURR OF A COFFEE MILL AND APPLIANCE COMPRISING SUCH A MILL

(75) Inventors: Mickaël Beule, Crouay (FR); Gilles Lebuffe, Conde sur Vire (FR)

(73) Assignee: SEB S.A., Ecully (FR)

( * ) Notice: Subject to any disclaimer, the term of this patent is extended or adjusted under 35 U.S.C. 154(b) by 926 days.

(21) Appl. No.: 12/201,577

(22) Filed: Aug. 29, 2008

(65) Prior Publication Data
US 2009/0056554 A1 Mar. 5, 2009

(30) Foreign Application Priority Data

Aug. 29, 2007 (FR) ..................................... 07 06052

(51) Int. Cl.
*H02H 7/08* (2006.01)
*H02P 3/18* (2006.01)
*H02P 25/10* (2006.01)
(52) U.S. Cl. .................... 318/490; 318/244; 318/245
(58) Field of Classification Search ................. 318/244, 318/245, 490
See application file for complete search history.

(56) References Cited

U.S. PATENT DOCUMENTS

| 4,477,752 | A | * | 10/1984 | Nakano et al. | ................ 388/823 |
| 6,252,372 | B1 | * | 6/2001 | Arroubi et al. | ................ 318/800 |
| 6,448,727 | B1 | * | 9/2002 | Rotterhusen | .................. 318/375 |
| 6,628,893 | B2 | * | 9/2003 | Ohno et al. | ..................... 388/800 |
| 2002/0153438 | A1 | * | 10/2002 | Glucksman et al. | ............ 241/36 |
| 2007/0170879 | A1 | * | 7/2007 | Martins | ......................... 318/268 |

FOREIGN PATENT DOCUMENTS

| EP | 1493368 A | 1/2005 |
| FR | 2648035 A | 12/1990 |

* cited by examiner

*Primary Examiner* — Derek Rosenau
(74) *Attorney, Agent, or Firm* — Browdy and Neimark, PLLC

(57) ABSTRACT

A method for counting the number of revolutions of a burr of a coffee mill driven in rotation by an electric motor. According to the method: at least one electrical parameter $P_i$ of the motor that varies in proportion to the speed of said motor is measured in a regular time interval $T_i$; the speed $V_i$ in each time interval $T_i$ is calculated from the parameter $P_i$ based on an experimentally obtained relation; and the number of revolutions $N_i$ made by the burr in each time interval $T_i$ is calculated from the speed $V_i$ determined.

13 Claims, 4 Drawing Sheets

METHOD FOR COUNTING THE NUMBER OF REVOLUTIONS OF A BURR OF A COFFEE MILL AND APPLIANCE COMPRISING SUCH A MILL

BACKGROUND OF THE INVENTION

The present invention relates to the field of appliances for the preparation of coffee infusions, more particularly espresso-type appliances comprising a coffee bean mill.

It relates more particularly to a method for counting the number of revolutions of a grinding burr of a coffee mill driven in rotation by an electric motor.

In appliances of the aforementioned type, the quantity of ground coffee dispensed by the burr is a function of the number of revolutions made by the latter. It is therefore important to accurately determine the number of revolutions made by the burr in order to dispense a predetermined dose of ground coffee during a drink production cycle.

An appliance comprising a coffee mill driven by an electric motor is known from the document FR 2648035. The number of revolutions made by the burr is determined by means of a sensor and a command for shutting off the motor is issued when a predetermined number of revolutions has been reached. The sensor, for example a Hall effect sensor, detects the passage of a marker, for example a magnetic marker, placed on a toothed wheel of a reduction gear placed between the motor and the mill.

This known method for counting the number of revolutions has the drawback of requiring a sensor equipped with jumper wires connected to a measuring circuit and a marker attached to a toothed wheel of the reducing gear. This configuration results in a high production and assembly cost and can induce reliability problems linked to a misalignment of the sensor with respect to the marker or to breaks in the jumper wires.

BRIEF SUMMARY OF THE INVENTION

The present invention provides an appliance for the preparation of coffee infusions comprising a method for counting the number of revolutions of the burr of a coffee mill that makes it possible to eliminate the use of a sensor and that is consequently simple and economical to use.

The invention also provides an appliance for the preparation of coffee infusions comprising a method for counting the number of revolutions of the burr of a coffee mill that offers high reliability without the use of jumper wires and moving parts.

To this end, the invention relates to a method for counting the number of revolutions of a burr of a coffee mill driven in rotation by an electric motor. This method is characterized in that:

at least one electrical parameter $P_i$ of the motor that varies in direct or inverse proportion to the speed of said motor is measured in a regular time interval $T_i$;

the speed $V_i$ in each time interval $T_i$ is calculated from said parameter $P_i$ based on an experimentally obtained relation;

the number of revolutions $N_i$ made by the burr in each time interval $T_i$ is calculated from the speed $V_i$ determined.

This method makes it possible to control the burr based on the direct measurement of an electrical parameter of the motor by a very simple measuring circuit included in the control circuit of the motor, without requiring any parts outside this control circuit.

Advantageously, the motor is shut off when the sum of the numbers of revolutions $\Sigma N_i$ reaches a predetermined number-of-revolutions threshold.

According to a particular embodiment of the invention, the electric motor is a motor that is powered by an alternating current and by a voltage U, and said parameter $P_i$ of said motor is the absorbed intensity.

The intensity measurement in this embodiment can be easily obtained via a shunt resistor and a microcontroller which are already required in the control circuit, and thus do not add many parts to this circuit.

Advantageously, the supply voltage U of the motor is measured and a correction is made to the speed calculation as a function of said voltage.

This feature makes it possible, with the use of an alternating current-powered motor, to obtain good precision in the counting of the number of revolutions independently of variations in the line voltage relative to the theoretical voltage supplied by the power mains.

According to another embodiment of the invention, the electric motor is a direct current-powered motor and the electrical parameter of the motor that varies in proportion to the speed of said motor is the counter-electromotive force.

Advantageously, the time interval $T_i$ is between 10 milliseconds and 1 tenth of a second, preferably 20 milliseconds.

This 20-millisecond sampling is easy to perform because it corresponds to one cycle of the line voltage at the power line frequency of 50 Hertz. If the power line frequency is 60 Hertz, the time interval $T_i$ is preferably 16.666 milliseconds.

According to another feature of the invention, the motor is shut off if the measured parameter $P_i$ is above a predetermined threshold in a given period.

Such a feature makes it possible to detect when the coffee mill is jammed and to consequently shut off the motor before it is damaged.

According to another feature of the invention, the motor is shut off if the parameter $P_i$ measured is below a predetermined threshold.

Such a feature makes it possible to detect when the coffee mill is empty and to stop the dispensing of an incorrect quantity of coffee by shutting off the motor.

Furthermore, the invention also relates to an appliance for the preparation of coffee infusions comprising a coffee mill that includes a burr whose number of revolutions is counted by means of the method that is the subject of the invention.

Such an appliance comprising a coffee mill that includes a burr whose number of revolutions is counted by means of the method that is the subject of the invention is simple and economical to use and has high reliability.

Advantageously, the appliance includes a memory in which an experimentally obtained relation between the parameter $P_i$ and the speed $V_i$ is stored.

This feature makes it possible to adapt the revolution-counting method to the characteristics of the motor in order to obtain good precision.

BRIEF DESCRIPTION OF THE DRAWINGS

The invention will be more clearly understood through the study of the embodiments taken as nonlimiting examples and illustrated in the attached figures, in which.

DETAILED DESCRIPTION OF THE INVENTION

Only the elements required for the comprehension of the invention have been illustrated.

The invention relates to a coffee preparation appliance comprising a coffee mill. The mill includes a burr driven by a motor via a reduction gear having a reduction ratio of, for example, forty.

According to a first particular embodiment of the invention, the motor is powered by alternating current.

Figure 1:
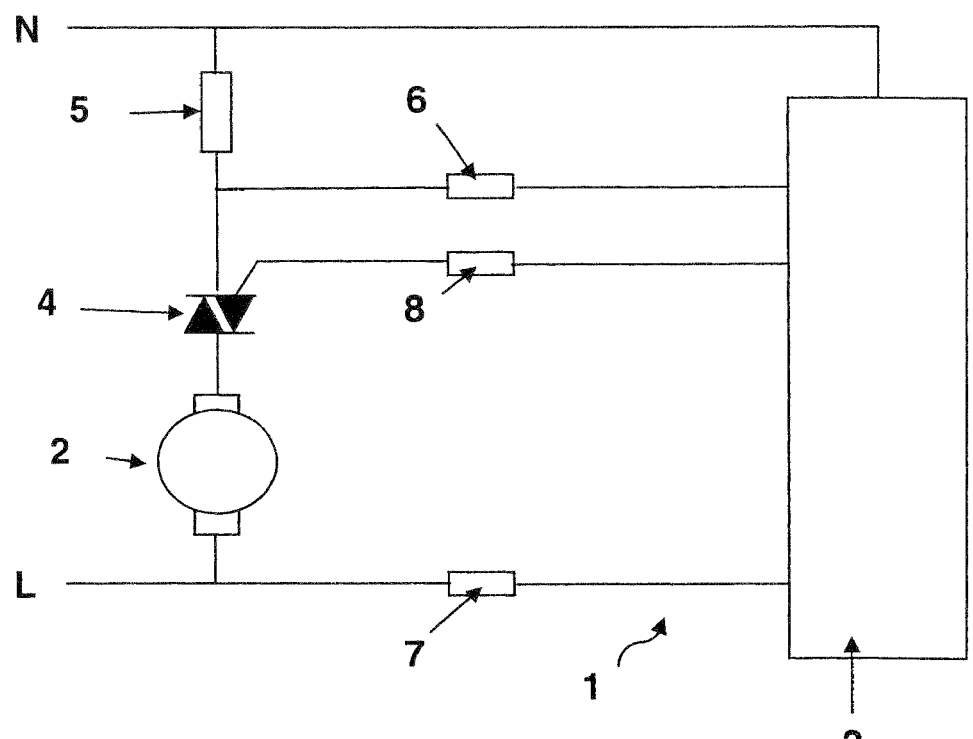
FIG. 1 is a schematic view of the control circuit of an alternating current-powered motor that drives the burr of a coffee mill according to a particular embodiment of the invention.

FIG. 1 schematically illustrates a control circuit 1 of an alternating current-powered motor 2 that drives the burr of a coffee mill. Said control circuit 1 includes a control element 4 for the motor 2 and an element 5 that provides representation of the current passing through the motor 2. Advantageously the control element for the motor is a triac 4 and the element that provides the representation of the current is a shunt 5. The triac 4 and the shunt 5 are connected in series with the motor 2 and are subjected via two terminals L and N to an alternating supply voltage when the appliance is plugged in.

Embedded in the control circuit 1 is a microcontroller 3 containing a program for controlling the various functions of the appliance. The microcontroller 3 receives at inputs and transmits at outputs various information. At an input 6, the microcontroller 3 receives at regular intervals, via the shunt 5, an instantaneous value of the current I passing through the motor. At another input 7, the microcontroller 3 receives the representation of the supply voltage U, which enables said microcontroller 3 to measure the value of the voltage and define the instant at which the voltage is equal to zero, an instant known as the zero crossing. From an output 8, the microcontroller 3 controls the triac 4.

Figure 3:
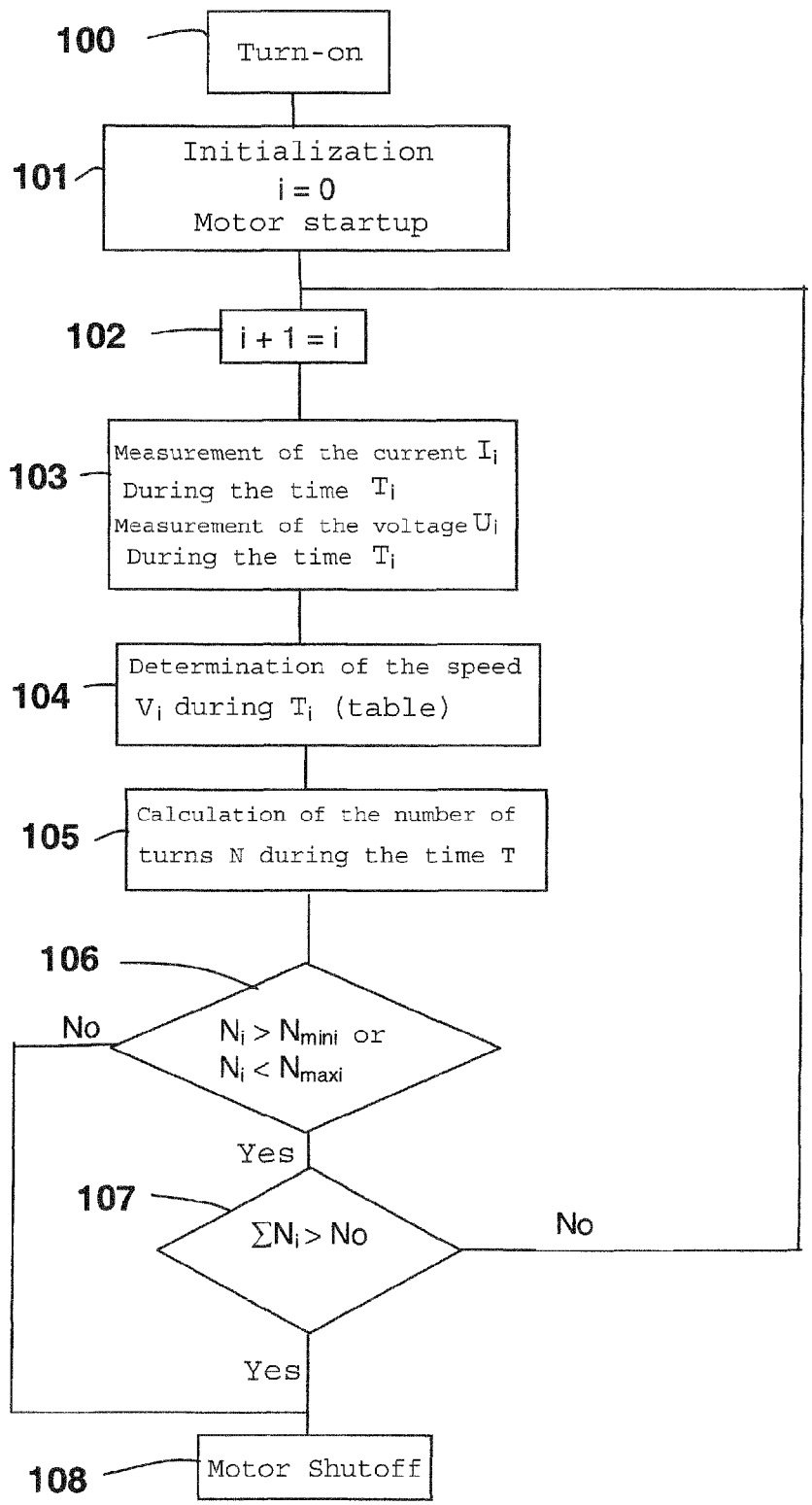
FIG. 3 illustrates an exemplary operating algorithm of the method for counting the number of revolutions of the burr of a coffee mill when it is driven by an alternating current-powered motor.

FIG. 3 represents the series of steps that enable a coffee mill whose burr is driven by an alternating current-powered motor to dispense a dose of ground coffee, i.e. leading up to the point at which the burr of the mill has completed a predetermined number of revolutions.

The first step 100 represented in the flow chart of FIG. 3 consists in turning on the coffee mill. In practice, to perform this step, the user operates a switch-type actuating mechanism that enables electric power to be supplied to the control circuit 1, after making sure that the container of the mill contains enough coffee beans.

The second step 101 is a step for initializing the program of the microcontroller 3. This step also comprises the resetting to zero of a time counter included in the microcontroller 3. The time unit $T_i$ of this counter is preferably 20 milliseconds, which corresponds to one cycle of the line voltage at the mains frequency of 50 Hz. This counter is embodied by the microcontroller 3 with the aid of the input 7 that receives the representation of the supply voltage. The zero crossing is the instant at which each new time unit $T_i$ starts, i being a subscript that is incremented at the start of each new time unit. During this step, the microcontroller 3 starts the motor 2 by actuating the triac 4 by means of its output 8.

Step 102 corresponds to the incrementing of the counter by the microcontroller 3 by the index i, which allows the time base to be clocked and allows the grinding cycle of the mill to proceed, time unit by time unit.

Step 103 is a step for measuring two parameters during the time unit $T_i$: the quantity of current $I_i$ passing through the motor and the power line voltage $U_i$.

To perform the measurement of the quantity of current $I_i$ passing through the motor 2 during the time unit $T_i$, the microcontroller 3 divides this time unit into samples of sufficiently short duration to obtain good precision in the measurement, for example 200 microseconds. In each sample, the microcontroller 3 acquires the value of the intensity I by means of its input 6 via the shunt 5 and calculates the sum of these values of I in order to obtain the quantity of current $I_i$ passing through the motor 2 during the time unit $T_i$.

The microcontroller 3 simultaneously performs the measurement of the voltage $U_i$ passing through the motor 2 during the time unit $T_i$ by means of its input 7 that receives the representation of the supply voltage.

When the time $T_i$ has elapsed, the microcontroller 3 executes step 104, which consists in determining the speed $V_i$ of the motor 2 during the time unit $T_i$.

Figure 2:
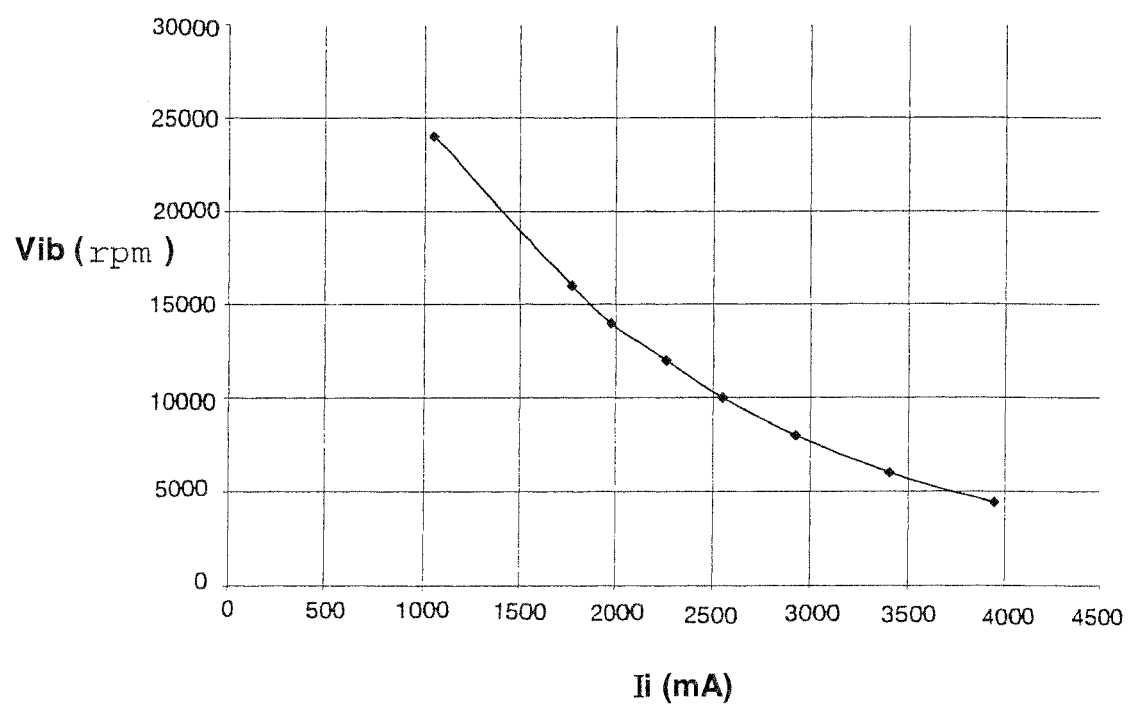
FIG. 2 illustrates an exemplary correspondence table between the quantity of current $I_i$ measured and the raw speed $V_ib$ of an alternating current-powered motor that drives the burr of a coffee mill.

To do this, the microcontroller 3 converts the quantity of current $I_i$ measured into a raw speed $V_ib$ using a correspondence table defined experimentally as a function of the characteristics of the motor 2 (FIG. 2), this table being stored in the microcontroller 3.

Lastly, to obtain the speed $V_i$ expressed as a number of revolutions per second, as a function of the measurement of the voltage $V_i$, the microcontroller 3 will correct the raw speed $V_ib$ by a correction coefficient $C_i$: $V_i = V_ib \times C_i$. The law of variation of the coefficient $C_i$ as a function of the voltage $U_i$ was determined experimentally and takes the form of a linear equation $C_i = 0.0076 U_i - 0.7202$. This law of variation is stored in the microcontroller 3.

Step 105 is a step for calculating the number of revolutions $N_i$ made by the motor 2 during the time $T_i$. The microcontroller 3 performs this calculation, given by the relation $N_i = V_i / Ti$.

Step 106 is a test step for verifying two cases of abnormal operation of the coffee mill.

The first case corresponds to a jamming of the motor 2, for example by a stone in the burrs. The detection of the jammed motor 2 makes it possible to protect the mechanical assembly driven by the motor 2; this detection must be fast and not very sensitive to electrical disturbances.

To perform the detection of the jammed motor 2, the microcontroller 3 compares the last five values of $N_i$ to a stored value $N_{mini}$. If each of these values is less than $N_{mini}$, the motor 2 is considered to be jammed, in which case the microcontroller 3 issues a command for shutting off the motor 2. If at least one of these five values is greater than $N_{mini}$, the microcontroller 3 continues the cycle and proceeds to the second part of the test in step 106.

Such a method makes it possible to disregard an electrical disturbance whose occurrence time is shorter than a period set at five time units $T_i$.

The second case of abnormal operation of the mill, detected in step 106, corresponds to a lack of coffee in the mill.

In the same way as in the detection of the jammed motor, the microcontroller 3 compares the last five values of $N_i$ to a stored value $N_{maxi}$. If each of these values is greater than $N_{maxi}$, the coffee mill is considered to be empty, in which case the microcontroller 3 issues a command for shutting off the motor 2. If at least one of these five values is less than $N_{maxi}$, the microcontroller 3 continues the cycle and proceeds to step 107.

The stored value $N_{maxi}$ can be an identical value for all of the appliances produced. Advantageously, the stored value $N_{maxi}$ can be customized for each appliance as a function of operational tests performed on the production line, and said stored value $N_{maxi}$ can also evolve over the life of the appliance as a function of the number of grinding cycles performed.

Step 107 is a test step for detecting the end of the coffee dose dispensing cycle. The microcontroller 3 includes a counter for calculating the sum of the numbers of revolutions $N_i$ and a stored value No corresponding to the number of revolutions of the motor required to dispense a dose of coffee.

The microcontroller compares the sum of the numbers of revolutions $N_i$ with the stored value No. If $\Sigma N_i < No$, the microcontroller returns to step 102. If $\Sigma N_i > No$, the number of revolutions of the motor 2 required to dispense a dose of coffee has been reached, and the microcontroller 3 proceeds to step 108, issuing a command for shutting off the motor 2 by means of its output 8.

According to a second embodiment of the invention, the motor is powered by direct current.

Figure 4:
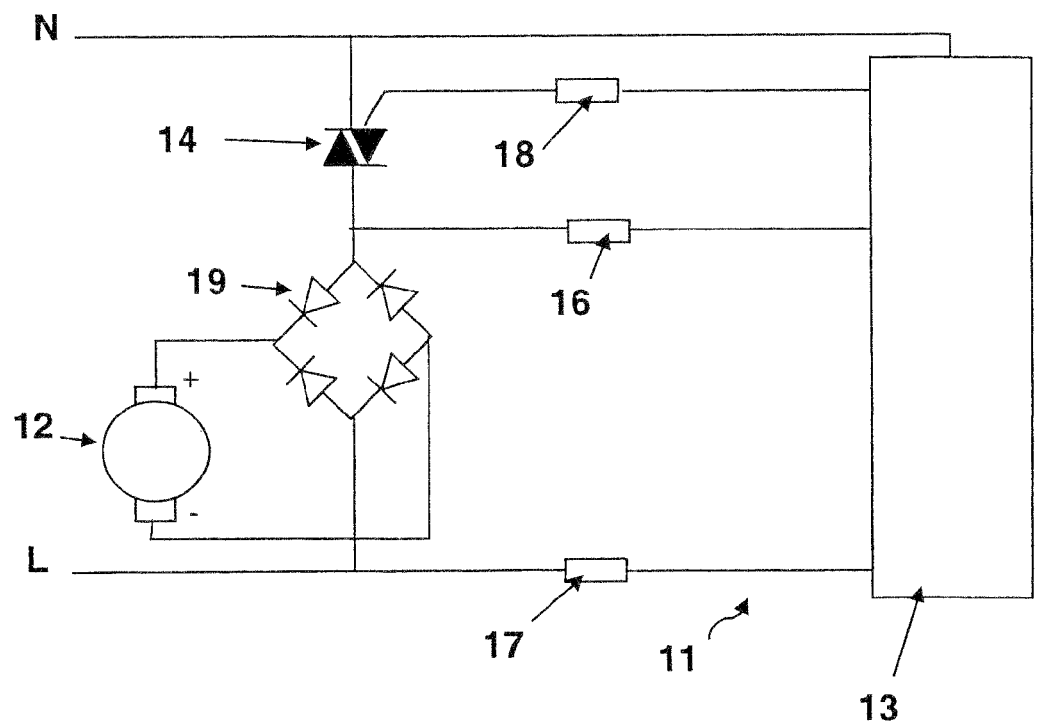
FIG. 4 is a schematic view of a control circuit of a direct current-powered motor that drives the burr of a coffee mill according to another particular embodiment of the invention.

FIG. 4 schematically represents a control circuit 11 of a direct current-powered motor 12 that drives the burr of a coffee mill included in an appliance for the preparation of coffee infusions. Said control circuit 11 includes a diode bridge 19 and a control element 14 for the motor 12. The control circuit 11 is subjected, via two terminals L and N, to an alternating supply voltage when the appliance is plugged in. The diode bridge 19 transforms the alternating voltage into a direct voltage at the terminals of the motor 12. Advantageously, the control element of the motor 12 is a triac 14.

Embedded in the control circuit 11 is a microcontroller 13 containing a program for controlling the various functions of the appliance. The microcontroller 13 receives at inputs and transmits from outputs various information. At an input 16, the microcontroller receives at regular intervals an instantaneous value of the counter-electromotive force CEMF of the motor 12. At another input 17, the microcontroller receives the representation of the supply voltage U, which enables said microcontroller 13 to measure the value of the voltage and to define the instant at which the voltage is equal to zero, an instant known as the zero crossing. From an output 18, the microcontroller controls the triac 14.

Figure 6:
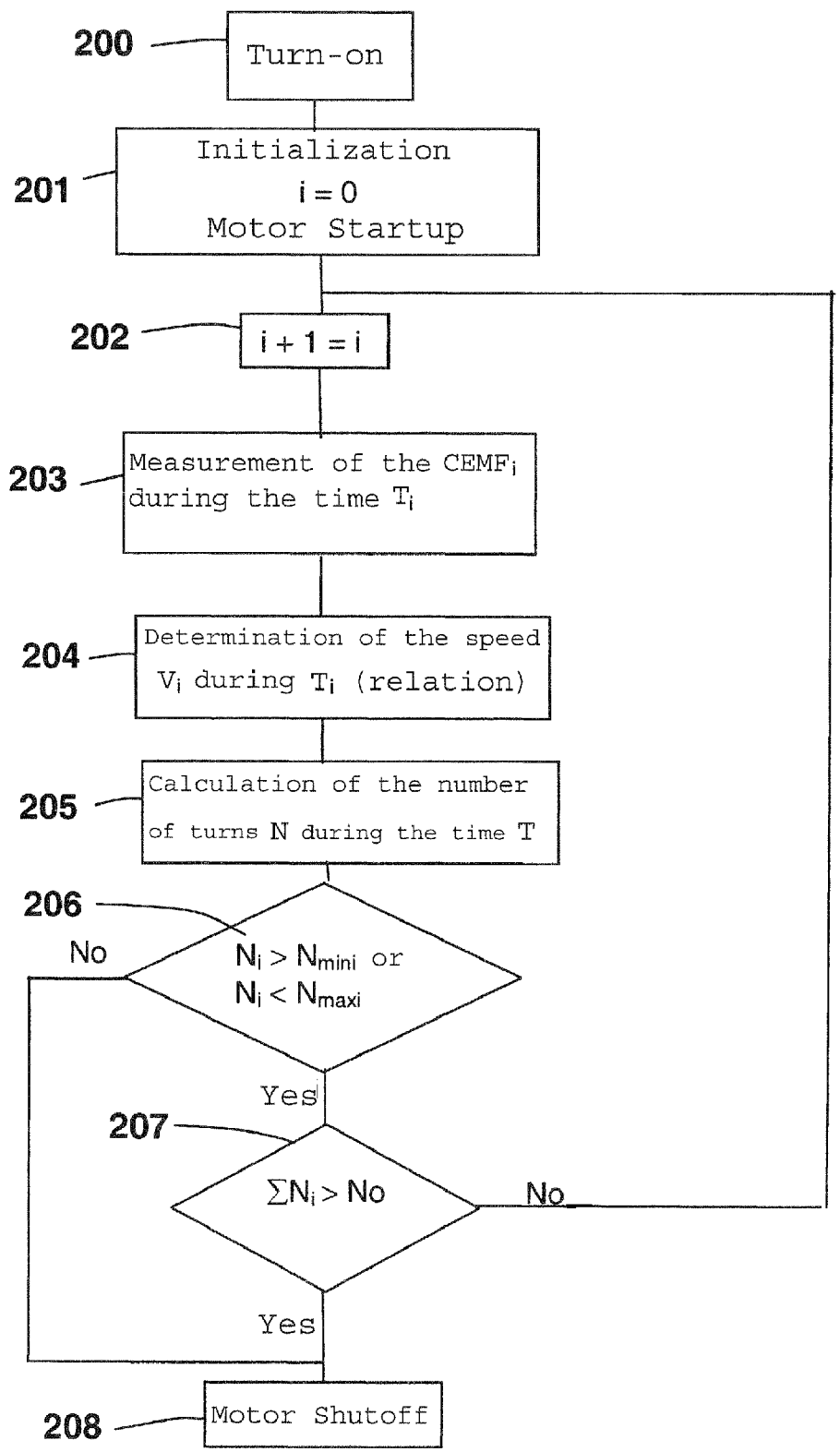
FIG. 6 illustrates an exemplary operating algorithm of the method for counting the number of revolutions of the burr of a coffee mill when it is a direct current-powered motor.

FIG. 6 represents the series of steps that enable a coffee mill whose burr is driven by a direct current-powered motor to dispense a dose of ground coffee, i.e. leading up to the point at which the burr of the mill has completed a predetermined number of revolutions.

Steps 200 (turning on the appliance), 201 (initialization and motor startup) and 202 (incrementing of the counter) are identical to steps 100, 101 and 102 described above.

Step 203 is a step for measuring the counter-electromotive force $CEMF_i$ during the time unit $T_i$.

The microcontroller 13 performs this measurement during a phase in which the motor 12 is not being supplied with powered, just after the zero crossing detected by means of its input 17 and prior to the actuation of the triac 14 controlled by the output 18. The microcontroller 13 measures the counter-electromotive force $CEMF_i$ by means of its input 16.

When the time $T_i$ has elapsed, the microcontroller 13 executes step 204, which consists in determining the speed $V_i$ of the motor 12 during the time unit $T_i$.

Figure 5:
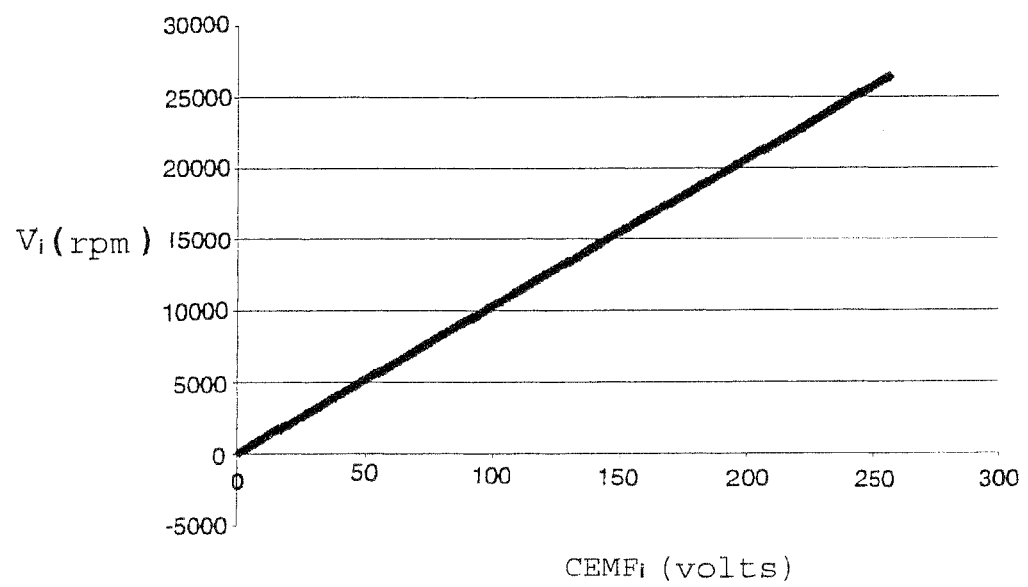
FIG. 5 illustrates an exemplary relation between the measured counter-electromotive force $CEMF_i$ and the speed $V_i$ of a direct current-powered motor that drives the burr of a coffee mill.

To do this, the microcontroller 13 converts the counter-electromotive force $CEMF_i$ measured into a speed $V_i$ by means of a linear relation defined experimentally as a function of the characteristics of the motor 12 (FIG. 5), this relation being stored in the microcontroller 13. In the example in FIG. 5, the relation takes the form of an equation: V=103.57 CEMF−113.87

The subsequent steps from 205 through 208 are identical to steps 105 through 108 described above.

It is understood that the invention is not in any way limited to the embodiments described and illustrated, which are given only as examples. Other modifications remain possible, particularly from the point of view of the composition of the various elements or the substitution of technical equivalents, without going beyond the scope of protection of the invention.

What is claimed is:

1. A method for counting the number of revolutions of a burr of a coffee mill driven in rotation by an electric motor, said method comprising:
    applying a supply voltage to the motor in order to drive the motor and the burr in rotation;
    measuring, in regular time intervals $T_i$, at least one electrical parameter $P_i$ of the motor that varies in direct or inverse proportion to the speed of the motor;
    calculating the speed $V_i$ during each time interval $T_i$ as a function of said parameter $P_i$ and based on an experimentally obtained relation; and
    calculating the number of revolutions $N_i$ made by the burr during each time interval $T_i$ based on the calculated speed $V_i$,
wherein the time interval $T_i$ is between 10 milliseconds and 100 milliseconds.

2. The method according to claim 1, further comprising shutting the motor off when the sum of the numbers of revolutions $\Sigma N_i$ reaches a predetermined number-of-revolutions threshold.

3. The method according to claim 2, wherein the electric motor is a motor that is powered by an alternating current and by a voltage U, and said parameter $P_i$ of said motor is the current supplied to the motor.

4. The method according to claim 3, wherein said measuring step comprises measuring the supply voltage U of the motor, and said step of calculating the speed comprises making a correction to the speed calculation as a function of the measured supply voltage.

5. The method according to claim 2, wherein the electric motor is a direct current-powered motor, and the electrical parameter of the motor that varies in proportion to the speed of the motor is the counter-electromotive force.

6. The method according to claim 1, wherein the electric motor is a motor that is powered by an alternating current and by a voltage U, and in that said parameter $P_i$ of said motor is the current supplied to the motor.

7. The method according to claim 1, wherein said measuring step comprises measuring the supply voltage U of the motor, and said step of calculating the speed comprises making a correction to the speed calculation as a function of the supply voltage.

8. The method according to claim 1, wherein the electric motor is a direct current-powered motor, and the electrical parameter of the motor that varies in proportion to the speed of the motor is the counter-electromotive force.

9. The method according to claim 1, wherein the time interval is 16 ⅔ milliseconds or 20 milliseconds.

10. The method according to claim 1, further comprising shutting the motor off if the measured parameter $P_i$ is above a predetermined threshold in a given period.

11. The method according to claim 1, further comprising shutting the motor off if the parameter $P_i$ measured is below a predetermined threshold.

12. An appliance for the preparation of coffee infusions comprising a coffee mill that includes a burr whose number of revolutions is counted by means of the method according to claim 1.

13. The appliance according to claim 12, further comprising a memory in which an experimentally obtained relation between the parameter $P_i$ and the speed $V_i$ is stored.

* * * * *